May 5, 1936.  J. C. HOOVER  2,039,905
CIRCUIT ANALYZER
Filed May 31, 1934   2 Sheets-Sheet 1

INVENTOR.
JOSEPH C. HOOVER
BY
ATTORNEY.

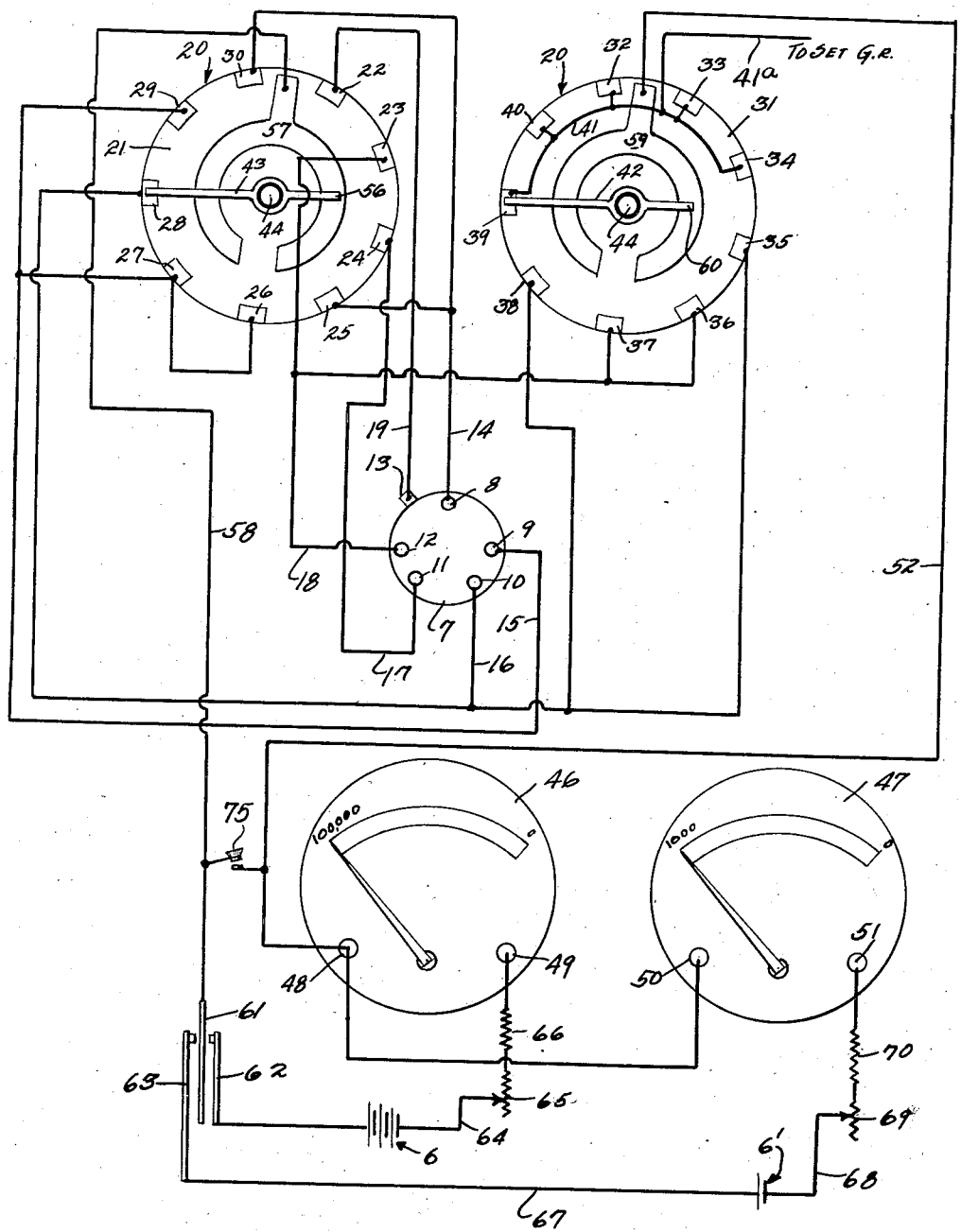

Patented May 5, 1936

2,039,905

UNITED STATES PATENT OFFICE 2,039,905

CIRCUIT ANALYZER

Joseph C. Hoover, Detroit, Mich.

Application May 31, 1934, Serial No. 728,329

5 Claims. (Cl. 250—20)

This invention relates to circuit analyzers for determining the electrical condition of the circuits or instrumentalities of a radio receiving set while in a static condition by energization with current of measured value, and this application is a continuation in respect to all common subject matter, of my application Serial No. 581,844, filed December 18, 1931.

The circuit analyzers or set checkers commonly on the market are of such character that current must be supplied to the power input of the receiver set in order to test the circuits and instrumentalities of the set and this of necessity involves more or less guesswork to locate the trouble, one obvious fault being that the set when under its own power input is energized as a whole and some circuits that are in normal condition may be affected and thus give a false reading due to fault in another circuit or instrumentality of the set.

Under a static test, there is a complete change in the manner of making the test in comparison with the commonly known dynamic test. The electrical condition of the various circuits and instrumentalities thereof is determined by energizing the circuit and/or the related instrumentalities by current of a predeterminable value applied to the circuit or instrumentality by the testing apparatus and the variation in the current in respect to its predetermined characteristics becomes readable upon a measuring instrument of a character determined by the character of the test being made; that is, an ohmmeter may be utilized for measuring resistance; a reactance meter is used if it is desired to measure inductance; a capacity meter may be utilized by means of which the value of a condenser in farads or micro-farads may be measured or an inductance or other meter may be used, only one of which instrumentalities is shown in the drawings.

Thus, previous testing apparatus in general has been devised to make a test by determining the value of current flowing through the various circuits or instrumentalities applied to the power input of the set while in the invention herein disclosed the test differs in that it determines the electrical condition of the various circuits or instrumentalities of the set by applying current of a predetermined value to the circuit terminals of the tube sockets.

A feature of my invention resides in the provision of an electrical measuring instrument and circuit therefor including a battery or other source of current supply and means for shorting the said circuit from the receiving set under test to permit the measuring instrument to be adjusted to give a predetermined reading of the current supplied and then including in adjusted measuring instrument circuit the circuit of the radio set to thereby secure a reading through variation in the measuring instrument as to capacity, inductance, reactance etc., depending upon the character of the electrical measuring instrument utilized.

It is also an object and feature of this invention to provide a circuit analyzer for use in discovering the faults in the electrical condition of a receiving set while in a static condition including a plug for introduction in the tube socket of a receiving set to permit the test to be made between the electrodes of the socket and ground and by use of the ground wire to make a test between the electrodes of the socket in which the plug is inserted and the electrodes of any other socket of the receiver.

It is thus not only an object of the invention to provide a means for testing the circuits of the socket while in a static condition but also to secure a reading of the electrical condition of the coupling device used between the grid of one socket and the plate of an adjacent socket.

A further object of the invention is to provide a switching arrangement by means of which the circuits having terminals in the socket may be successively brought to test.

A still further object of the invention is to provide a device of the character stated that is of simple construction, is readily operable by those familiar with the testing of radio receiving sets and one which will expedite the testing and that will give a more perfect reading of the conditions of the circuits of the sets and instrumentalities than is possible with previously well known testing devices.

These objects and the several novel features of the invention are hereinafter more fully described and claimed and the preferred form of construction by which these objects are attained is shown in the accompanying drawings in which—

Fig. 4 is a wiring diagram of the device.

Figure 1:
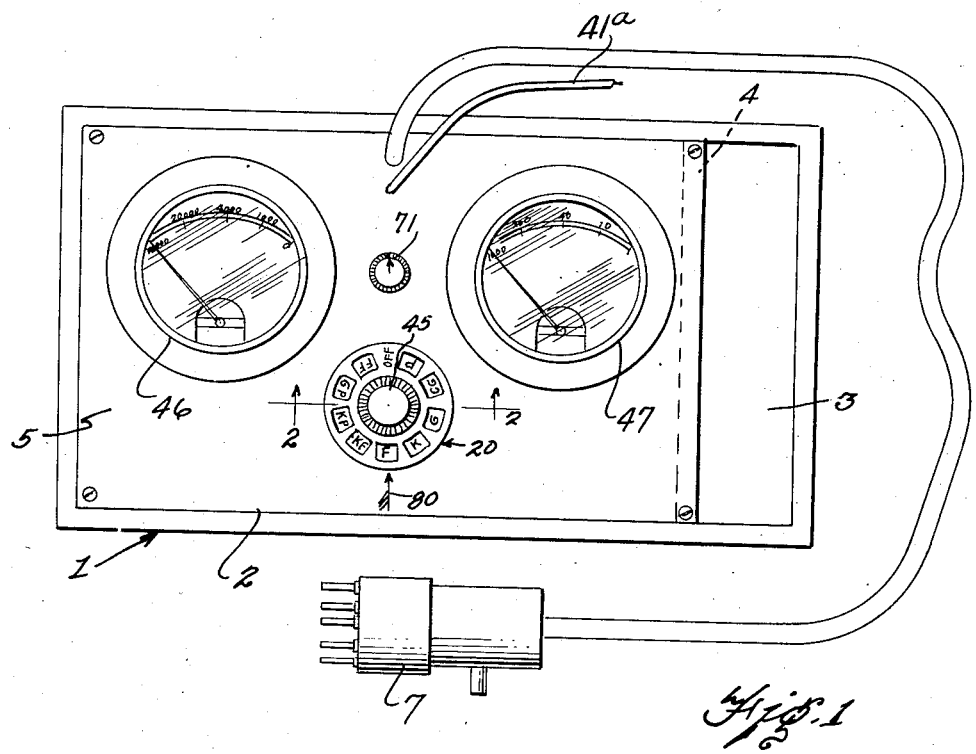
Fig. 1 is an elevational view of my improved testing device.
Figure 3:
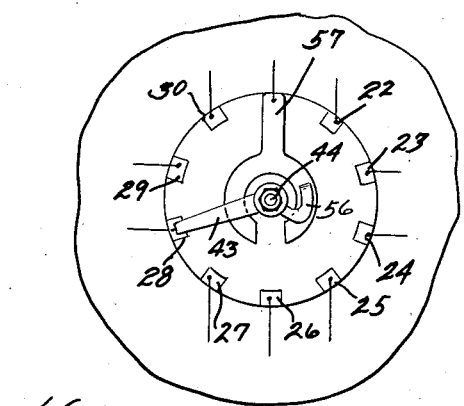
Fig. 3 is a view taken on line 3—3 of Fig. 2.
Figure 2:
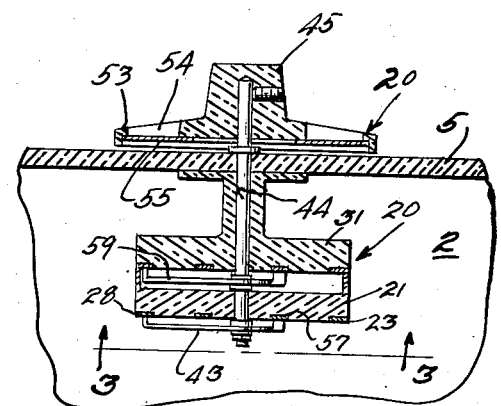
Fig. 2 is a section taken on line 2—2 of Fig. 1.

Referring to the drawings, the cabinet 1 is divided into the compartments 2 and 3 by means of the partition 4. The compartment 2 is closed by the panel 5 and houses the batteries 6 and 6'. The compartment 3 provides a space in which the plug and cable may be inserted when the device is not in use. The plug 7 is provided with the terminals 8, 9, 10, 11 and 12 which extend from one end thereof and a terminal 13 extending from the side of the plug.

The terminal 8 has one end of the electric wire 14 connected thereto and the terminals 9, 10, 11 and 12 have one end of the respective electric wires 15, 16, 17 and 18 respectively connected thereto and the terminal 13 has one end of the wire 19 connected thereto. The rotary switch 20 comprises the insulating disc 21 having the contacts 22, 23, 24, 25, 26, 27, 28, 29 and 30 positioned on one face thereof and the insulating disc 31 having the contacts 32, 33, 34, 35, 36, 37, 38, 39 and 40. The wire 14 connects to the terminal 30 and also to the terminal 25 while the wire 15 connects to the terminals 26, 27 and 29 and the wire 16 connects to the terminal 28 and to the terminals 35 and 38 and the wire 17 connects to the terminal 24 and the wire 18 connects to the terminals 23, 36 and 37. The wire 19 connected to the terminal 13 has its opposite end connected to the terminal 22. A wire 41 is connected to the terminals 32, 33, 34, 39 and 40 and is adapted to be connected to the ground 41ª of the set under test.

A pair of switch arms 42 and 43 are secured on the post 44 but insulated therefrom and are operable by the knob 45 to move the switch arms to their various positions as will be more fully described.

A pair of ohmmeters 46 and 47 are positioned in the panel 5 and are of standard construction and the meter 46 is provided with the binding posts 48 and 49 while the meter 47 is provided with the binding posts 50 and 51. The meter 46 is constructed with a dial which registers ohms from 0 to 100,000 while the meter 47 reads ohms from 0 to 1,000. Of course, various other readings may be provided but these are the principal scales commonly used. It is also pointed out that one ohmmeter with two or more scales may be employed with equal facility to cover the range of ohms required. A wire 52 has one end connected to the switch arm 42 while the opposite end is connected to the binding posts 48 and 50 of the respective meters 46 and 47. The switch 45 is formed with a flange 53 having a plurality of apertures 54 therein. A disc 55 having indicia thereon is secured to the flange 53 and the indicia is visible through the aperture 54 as shown in Fig. 1. The end 56 of the arm 43 rides on the contact member 57 to which one end of the wire 58 is connected. A similar contact member 59 is positioned on the disc 31 and the end 60 of the arm 42 contacts therewith. The wire 52 is connected to the member 59 as is shown in Fig. 4. The wire 58 is connected to the switch arm 61 positioned between the contact members 62 and 63, the arm 62 being connected to one side of the battery 6 of the desired voltage depending upon the instrument scale used, the opposite side of the battery being connected by the wire 64 to the variable resistor 65 for permitting adjustment of the ohmmeter 46.

To permit this adjustment to be readily made, I provide a short-circuiting switch 75 connecting across the wires 52 and 58. This may be of the ordinary push button type which may be held closed to permit the adjustment of the measuring instrument and then released to include the switching means, plug and connected circuit of the receiving set. Thus by first adjusting the electrical instrument circuit to give a predetermined reading and then including the above stated instrumentalities and circuit of the radio receiver set, a new reading will be given which, in comparison with the predetermined reading, enables the operator to determine the static electrical properties of the circuit under test.

The resistor 65 is connected to the resistor 66 that in turn being connected to the binding post 49. The contact arm 63 is connected by the wire 67 to one side of the battery 6', the same preferably being of one and one-half volt capacity. The opposite side of the battery 6' is connected by the wire 68 to the variable resistor 69 for permitting adjustment of the ohmmeter. The variable resistor 69 is connected to the resistor 70 that in turn being connected to the binding post 51 of the ohmmeter 47. The switch arm 61 is operable by the knob 71, positioned on the panel 5 to move the arm into contact with the arm 63 or to the other position to contact the arm 62. It will thus be seen by referring to Fig. 4, that when the arm 61 is thrown to a position to contact the arm 62, the readings will be taken on the ohmmeter 46 and when the arm 61 is thrown to its opposite position readings will be taken on the ohmmeter 47.

The dial on the rotary switch is so lettered that the position thereof indicates a circuit across which the meter is placed. In testing a set to find any fault located therein there are two different types of readings taken namely, intra-socket and socket electrodes to ground. These two readings furnish the data required to locate the fault in the set. When the switch is turned so that the letters FF align with the arrow 80 on the panel the resistance between the filament electrodes of the socket or between the heater posts of the socket is indicated.

When the switch is moved to its next position so that the letters GP are opposite the arrow 80 the resistance between the plate electrodes and the grid electrode of the socket is indicated. When the switch is turned to its next position so that the letters KP align with the arrow 80 the resistance across the plate electrode and the cathode electrode of the socket is indicated. In the next position KF the resistance between one of the filaments or heater electrode and the cathode electrode of the socket is indicated. These readings are commonly known as intro-socket readings. When the switch is turned so that the letter F coincides with the arrow 80 the resistance between the filament circuit and the ground of the receiver is indicated. In the next position K the resistance between the cathode electrode of the socket and the ground of the receiver is indicated.

In the position G the resistance between the grid electrode of the socket and the ground of the receiver is indicated. In the next position CG the resistance between the control grid electrode of the tube and the ground is indicated. In the position P the resistance between the plate electrode of the socket and the ground of the receiver is indicated.

The operation of the device is as follows: The power input to the set is first disconnected and the tubes removed from the set. The plug 7 is then inserted in one of the sockets of the set and the knob 45 rotated from its off position to the position FF and the reading taken on whichever ohmmeter is connected. If the proper reading cannot be ascertained by this ohmmeter the knob 71 is turned to place the other ohmmeter in operative position. After the various readings have been taken the plug 7 is removed and inserted in the next socket and the reading for that socket taken and so on down through the set so that every socket is tested. In the event that any of the readings do not correspond to the proper readings for a set of that particular character the fault becomes readily apparent and may be quickly remedied.

In testing D. C. sets the batteries must first be disconnnected and all the wires short-circuited by connecting them together so that each circuit of the socket will be continuous. It will be seen therefore that the readings will be the same as with A. C. sets except that the readings will be lowered by the resistance of the voltage divider employed in A. C. sets.

It is to be understood that where the term "static condition" is used that the same applies to the condition of a receiving set in which the power input is not connected so that there is no current flow through the set. It will thus be seen that, with a circuit analyzer of the character described, a definite current and voltage may be applied to the various circuits and since the resistance of every circuit in a receiving set is a definite known quantity the resistance reading in ohms will immediately locate any fault in the circuit being tested.

The foregoing descriptive matter is practically confined to the use of an ohmmeter but it is to be understood that this showing of an ohmmeter is only typical of a measuring instrument of any of the various characters used in testing circuits and if a test to determine continuity of the circuits is the only test required, a voltmeter may be utilized.

The switching arrangement described and shown clearly in Fig. 4 has two switching members in insulated relation and these may be operated simultaneously so that the circuit being tested may be placed across to the output terminals of the testing instrument and it also must further be so arranged that any one electrode of a socket into which the test cable is plugged may be tested in conjunction with any other electrode of any other socket or between the electrode under test and the electrical ground of the receiver.

This is therefore a differential system in which the static electrical properties of any circuit or combination of circuits in the receiver may be checked and is universally adapted to any type of receiver. In all cases, current of predetermined value and voltage is applied to the receiver circuit under test and in conjunction with the switchable means and test cable adjusting means is also required in order that a predetermined value of current may be established before the test is made which is accomplished by the switch 75 and variable resistors 65 and 69.

In making the test between any two terminals of a socket with which the electrodes of the plug are connected, the wire 41ª is connected to the ground of the set. Thus the electrical condition between socket terminals and the ground of the set will be indicated on the measuring instrument. Thereafter, the wire 41ª is disconnected from the ground and connected to a terminal of a tube socket of the set other than the one occupied by the plug whereby the electrical condition existing between any given electrode socket under test and any terminal of any other socket of the set may be determined. This latter test is most frequently made between the grid terminal of one tube and the plate terminal of a succeeding tube and thus gives the electrical condition of the coupling device used to transfer the signal from one tube to a following tube. It is also advantageous to attach the wire 41ª to the high potential end of the power supply to determine the electrical condition existing between any socket terminal and the power supply.

From the foregoing description it becomes evident that I have provided a static analyzer for radio receiving sets which will permit the testing of the various circuits of the set and which will give a reading in terms of the measuring instrument utilized across the various circuits thereby permitting the faults in any of the circuits to be readily ascertained and further that the device is simple in operation and will permit receiving sets to be tested when the same are not in normal operative condition.

Having thus briefly described my invention, its utility and mode of operation, what I claim and desire to secure by Letters Patent of the United States is—

1. The combination with a radio receiving set, of means for testing a circuit of the set having terminals in a tube socket thereof while in static condition comprising an electrical measuring instrument having a dial and pointer, an energized circuit therefor, means in said circuit for adjusting the same to indicate certain current value on the measuring instrument dial, a plug having electrodes electrically connected with the measuring instrument circuit adapted for insertion in the tube socket to contact the current terminals thereof, and a switching means by which a circuit of the set having terminals in a socket engaged by any two electrodes of the plug may be included in the measuring instrument circuit or excluded to independently permit adjustment of the current value of the measuring instrument circuit, the variation in the measuring instrument reading under the two possible electrical conditions caused by adjustment of the switch visibly indicating the electrical properties of the receiver circuit under test.

2. The combination with a radio receiving set circuits having terminals in the tube sockets, of means for testing the circuit while in the static condition, comprising an electrical measuring instrument, a circuit therefor, a plug having terminals for engaging the terminals of any socket, means for energizing the measuring instrument circuit, means for adjusting the circuit to thereby cause the instrument to indicate certain current value corresponding to the electrical properties for which the test is being made, and a switch having a plurality of contacts, a plurality of wires connecting the contacts of the plug with the contacts on the switch whereby, by adjustment of the switch, a circuit of the receiving set between any two terminals of a tube socket may be electrically connected with the plug, and a second switch operable to isolate the measuring instrument and its circuit permitting adjustment to indicate certain current value or to include the measuring instrument and its circuit in the set circuit being tested, variation in current value indicated by the measuring instrument due to the isolated and included relationship with the set circuit under test providing means for determining the electrical properties of the set circuit under test.

3. Means for testing the circuits of a receiving set and instrumentalities thereof while in a static condition, the various circuits having terminals in the various sockets of the set, comprising an electrical measuring instrument of the character required in making the test, a circuit therefor, a battery in the circuit, an adjustable resistance in the circuit, a switch operable at will for closing the measuring instrument circuit permitting the resistance to be adjusted to cause the measuring instrument to indicate certain current value, a switch and a plug connectable in the measuring instrument circuit by opening said first named switch, the plug being adapted for insertion in any tube socket of the receiving set, and the second named switch providing means for connecting the measuring instrument circuit across any two electrodes of the socket having the plug or to connect an electrode of the socket with the electrical ground of the set.

4. Means for testing the circuits of a radio receiving set having terminals in a tube socket thereof while in a static condition, comprising an electrical measuring instrument of the character required in making the desired test, an energized circuit therefor, an adjustable resistance in the measuring instrument circuit, a switch operable to isolate the electrical instrument circuit from the set circuit under test permitting an adjustment of the resistance to secure a predetermined reading of the current value of the energized current and operable at will to include the measuring instrument circuit and instrumentalities therein in the circuit of the set under test, and switching means for connecting the measuring instrument circuit to any two tube socket terminals to thereby cause current to flow from the energized measuring instrument circuit through the tube socket terminals and circuit of the receiving set connected therewith.

5. Means for testing the circuits of a radio receiving set having terminals in the tube sockets thereof and while in a static condition, comprising an electrical measuring instrument of the character required in making the desired test, an energized circuit therefor, an adjustable resistance in the energized circuit whereby the measuring instrument may be set to indicate certain current value, a switch for isolating the measuring instrument circuit and instrumentalities therein from the circuit of the radio set under test and a second switch device and plug included at will by the first named switch in the measuring instrument circuit, the plug being adapted for insertion in any of the sockets of the set, and the second switch device being of a character to connect the measuring instrument circuit across any two electrodes of the socket or to connect an electrode of the socket with the electrical ground of the receiving set, or between an electrode and any point in the set to thereby apply the current of the measuring instrument circuit to the contacted electrodes of the set.

JOSEPH C. HOOVER.